United States Patent [19]

Tahara

[11] Patent Number: 4,552,111
[45] Date of Patent: Nov. 12, 1985

[54] ENGINE KNOCKING DETECTING MEANS

[75] Inventor: Yoshitaka Tahara, Hiroshima, Japan

[73] Assignee: Mazda Motor Corporation, Hiroshima, Japan

[21] Appl. No.: 514,846

[22] Filed: Jul. 18, 1983

[30] Foreign Application Priority Data

Jul. 20, 1982 [JP] Japan .................................. 57-128190

[51] Int. Cl.[4] .......................... F02P 5/14; F02D 5/04; G01I 23/22
[52] U.S. Cl. .................................... 123/425; 123/435; 123/571; 123/419
[58] Field of Search ............... 123/425, 435, 571, 419, 123/417, 416

[56] References Cited

U.S. PATENT DOCUMENTS

| 4,344,400 | 8/1982 | Asano .................................. 123/425 |
| 4,346,586 | 8/1982 | Furrey .................................. 123/425 |
| 4,356,551 | 10/1982 | Iwase et al. ......................... 123/425 |
| 4,385,607 | 5/1983 | Honiden et al. ..................... 123/425 |
| 4,393,837 | 7/1983 | Sugihara et al. .................... 123/425 |
| 4,417,556 | 11/1983 | Latsch ................................. 123/425 |
| 4,448,163 | 5/1984 | Yoshida .............................. 123/425 |

FOREIGN PATENT DOCUMENTS

5638562  9/1979  Japan .................................... 123/425

Primary Examiner—Raymond A. Nelli
Attorney, Agent, or Firm—Fleit, Jacobson, Cohn & Price

[57] ABSTRACT

An engine knocking detecting device comprising an engine vibration sensor for sensing engine vibrations and producing electric signals representing the engine vibrations, a knocking detecting circuit including a knocking signal discriminating circuit such as a band pass filter for detecting signals representing engine vibrations caused by engine knocking and a knocking intensity detecting circuit for detecting durations of the signals representing the engine knocking vibrations to thereby detect intensity of the engine knocking. The knocking intensity detecting circuit may include a comparator for comparing the signal which have passed through the band pass filter with a reference value which may be varied in accordance with noise and producing an output when the signal from the filter means is greater than the reference value.

7 Claims, 9 Drawing Figures

⟨BACKGROUND ROUTINE⟩

⟨INTERRUPT ROUTINE 1 60° AFTER TDC⟩

ENGINE KNOCKING DETECTING MEANS

BACKGROUND

The present invention relates to engine knocking detecting means.

Conventionally, engine knocking detecting means include engine vibration sensors mounted on engines for sensing engine vibrations and producing engine vibration signals which are passed through appropriate filter circuits so that only the signals of frequency band corresponding to engine knocking vibrations are passed to detecting circuits. Usually, the detecting circuits include integrating circuits for integrating the signals from the filter circuits to produce signals representing intensities of the knocking. The conventional arrangements can perform accurate and precise detections of the intensities of the engine knocking when the engine knocking is produced occasionally or intermittently. However, for repetitive engine knocking, a succeeding signal is produced while a preceding signal is being integrated so that the signals may be superposed possibly causing a measurement error.

In Japanese patent application No. 54-112429 filed on Sept. 4, 1979 and disclosed for public inspection on Apr. 13, 1981 under the disclosure number 56-38562, there is disclosed an engine knocking detector in which the engine vibration signals representing engine knocking are converted into pulse signals which are counted to detect the engine knocking. The proposed engine knocking detector is however inconvenient because it simply counts the number of vibration signals but cannot discriminate a weak engine knocking from a strong one. Since the engine knocking detectors are used for controlling the engine operating conditions such as ignition timing or air-fuel ratio of the intake mixture, such inconveniencies disturb precise control of engine.

OBJECTS AND SUMMARY

It is therefore an object of the present invention to provide engine knocking detecting means which can precisely detect the intensity of engine knocking.

Another object of the present invention is to provide engine knocking detecting means which can effectively be used for controlling engine operating conditions.

According to the present invention, the above and other objects can be accomplished by engine knocking detecting means comprising engine vibration sensing means for sensing engine vibrations and producing electric signals representing the engine vibrations, knocking detecting circuit means including knocking signal discriminating means for detecting signals representing engine vibrations caused by engine knocking and knocking intensity detecting means for detecting durations of the signals representing the engine knocking vibrations to thereby detect intensity of the engine knocking. The knocking signal discriminating means may comprise filter means which allows to pass only the signals of frequency band corresponding to engine knocking vibrations and the knocking intensity detecting means may include comparing means for comparing the signal which has passed through the filter means with a reference value which may be varied in accordance with noise and producing an output when the signal from the filter means is different from the reference value. The knocking intensity detecting means may further include means for measuring duration of the output of the comparing means.

The knocking detecting means in accordance with the present invention maybe combined with an engine having ignition timing control means in such a manner that the ignition timing is retarded when the engine knocking is detected. In such a case, the ignition timing may be retarded by a greater extent when a stronger knocking is detected than when a weaker knocking is detected.

BRIEF DESCRIPTION OF THE DRAWINGS

The above and other objects and features of the present invention will become apparent from the following descriptions of preferred embodiments taking reference to the accompanying drawings, in which;

FIG. 4 (b) shows pulse forms produced in the circuit shown in FIG. 4(a);

BRIEF DESCRIPTION OF EMBODIMENTS OF THE INVENTION

Figure 7:
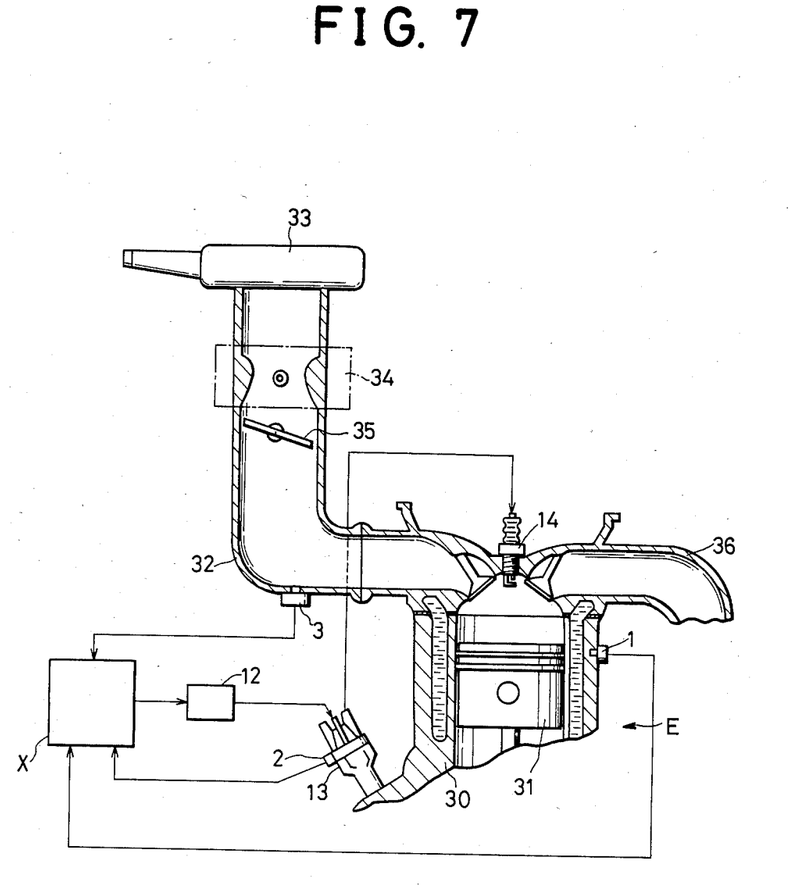
FIG. 7 is a sectional view of an engine having a knocking detecting device in accordance with present invention.

Referring to the drawings, particularly to FIG. 7, there is shown an engine E having a cylinder 30 and a piston 31 which reciprocates in the cylinder 30. The engine E also has an intake passage 32 provided with an air cleaner 33, a carburetor 34 and a throttle valve 35 as conventional in the art. The engine E is further provided with an exhaust passage 36.

Figure 1:
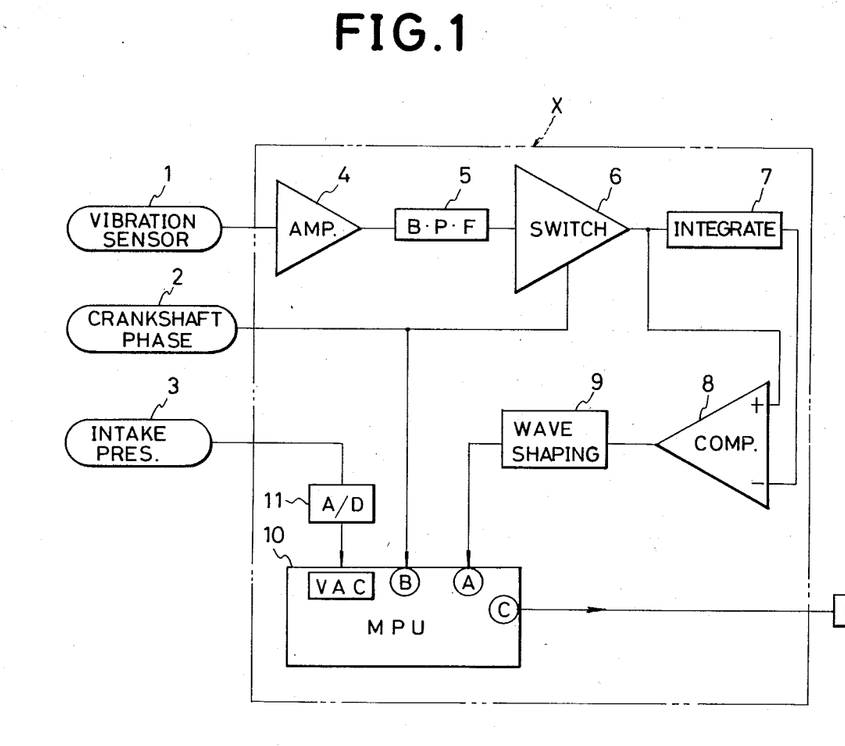
FIG. 1 is a circuit diagram showing the engine knocking detector in accordance with one embodiment of the present invention.
Figure 2:
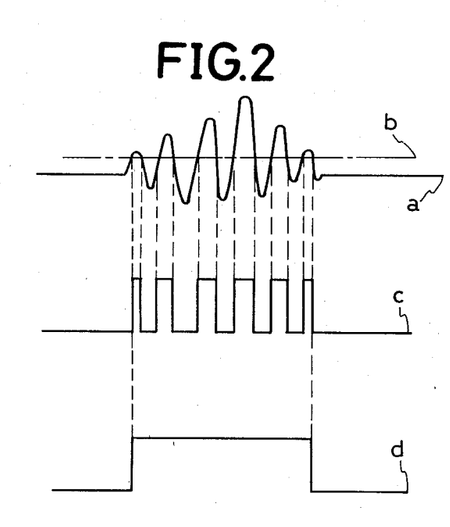
FIG. 2 is a diagram showing wave forms of signals produced in the circuit shown in FIG. 1.

Referring then to FIG. 1, there is shown an engine knocking detecting device including a vibration sensor 1 which is mounted on the engine E shown in FIG. 7 to produce engine vibration signals. There is also provided a detecting circuit X including an amplifier 4 to which the output of the vibration sensor 1 is connected. The amplifier 4 has an output connected with a band pass filter 5 which is in turn connected with an electronic switching device 6. The band pass filter 5 functions to pass only the signals of frequency band corresponding to engine vibrations caused by engine knocking. An example of such engine knocking signal is shown in FIG. 2 by a curve a.

The engine E is also provided with a crankshaft phase detector 2 which produces an output signal in each operating stroke when the crankshaft is at a predetermined phase or an angular range. The output of the detector 2 is applied to the switch 6 to turn it on. The signal which has passed through the switch 6 is applied on one hand directly to the positive input terminal of a comparator 8 and on the other hand through an integrating circuit 7 to the negative input terminal of the comparator 8. The integrating circuit 7 functions to average the signal a from the switch 6 to produce a reference level signal b and the signals a and b are compared by the comparator 8. When the signal a is greater than the reference level signal b, the comparator 8 produces an output as shown by c in FIG. 2. The output pulses c from the comparator 8 is applied to a wave shaping circuit 9 which produces an output pulse d. The pulse d from the wave shaping circuit 9 is applied to a port A of a controller 10.

The controller 10 has another port B which is applied with the signal from the crankshaft phase detector 2. The detector 2 functions to produce the output signal when the cylinder in question is at a phase wherein knocking is apt to occur. In the embodiment, the signal is produced when the crankshaft phase of the cylinder in question is between the top dead center and 60° after top dead center. Thus, the engine vibrations are sampled only in the phase of operating cycle wherein the knocking is apt to occur. This arrangement is advantageous in that it is possible to prevent or at least decrease sensing engine vibrations other than the knocking vibrations, such as the vibrations produced at the time of ignition or those caused by the valve operations. This arrangement is therefore effective to make more accurate the reference signal provided by the integrating circuit 7.

The engine E is also provided with an intake pressure sensor 3 provided in the intake passage 32 for detecting the engine intake pressure. The signal from the sensor 3 is converted by an A/D converter 11 into a digital signal which is also applied to the controller 10. The controller 10 has an output C which is connected with an igniter unit 12 of the engine ignition system. The igniter unit 12 is connected with a distributor 13 which governs operations of ignition plugs 14 provided on respective engine cylinders. The igniter unit 12 may be of a known type which functions to control the ignition timing in accordance with the engine operating conditions. In the illustrated embodiment, the igniter unit 12 is further connected with the output C of the controller 10 to be controlled thereby.

Figure 3:
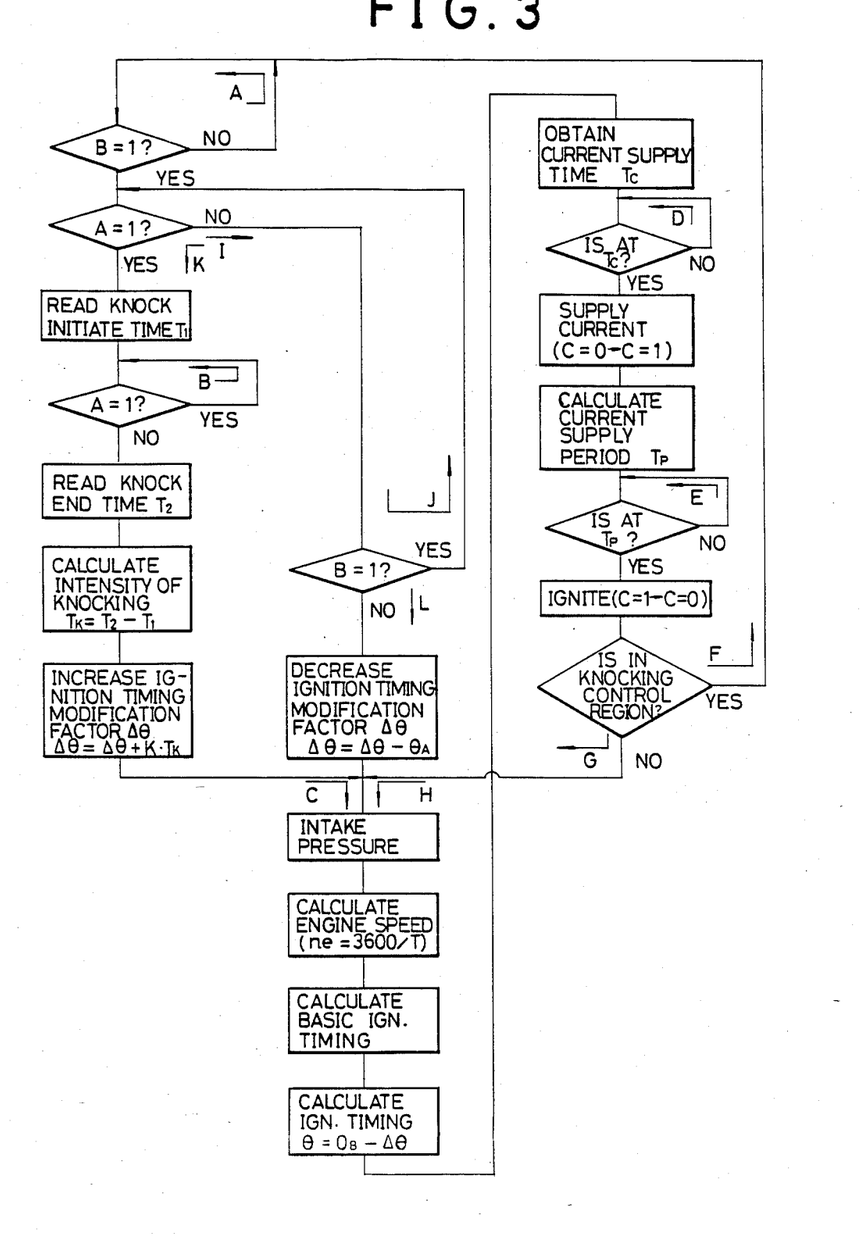
FIG. 3 is a chart showing the program flow which is adopted in the embodiment shown in FIG. 1.

The function of the controller 10 will now be described with reference to FIG. 3. At first, the signal from the crank shaft phase detector 2 is discriminated and, when the signal is at a low level or 0, the same procedure is repeated since it is unnecessary to datect the engine knocking. When the signal from the crank shaft phase detector becomes high level or 1, discrimination is made as to whether the signal from the wave shaping circuit 9 is at a high level or 1. When the signal from the circuit 9 becomes high, it is judged that knocking has occurred and the knocking initiating time $T_1$ is read. In each sampling time, the signal from the circuit 9 is judged and, when it is found that the signal has turned to low level, the knocking end time $T_2$ is read. Then, the intensity of knocking is calculated in terms of the duration $T_k$ thereof. Thereafter, calculation is further made to obtain the value $\Delta\theta$ of retard of ignition timing which is necessary to eliminate reoccurrence of knocking. The calculation is made based on the formula $\Delta\theta = \Delta\theta + k \cdot T_k$ where k is a constant. The calculated value $\Delta\theta$ is taken into account in determining the ignition timing.

In determining the ignition timing, the signal from the intake pressure sensor 3 is introduced to calculate the intake pressure and then the signal from the crankshaft phase sensor 2 is introduced to calculate the engine speed. Based on these signals, a calculation is made to obtain a basic ignition timing $\theta_B$ and then a desired ignition timing $\theta$ is calculated using the previously obtained value $\Delta\theta$ in accordance with the formula $\theta = \theta_B - \Delta\theta$. Thereafter, calculation is made to obtain the time Tc at which the current supply to the ignition coil is to be started and at the time Tc a high level signal is applied from the output c of the controller 10. Further, calculation is also made to obtain an ignition duration time period Tp and when the time period Tp has passed after the time Tc the output from the controller 10 is turned to low level. After the ignition, judgement is made based on the signal from the crankshaft phase detector 2 to judge as to whether the cylinder in question is in the range of the operating cycle wherein knocking is apt to occur and if the cylinder is in such range the afore-described procedure is repeated as shown by an arrow F in FIG. 3.

When the signal from the circuit 9 is of low level showing that knocking is not taking place, judgement is made as to whether the signal from the crankshaft phase detector 2 is of high level. When the signal is of high level showing that the cylinder in question is in the range of operating cycle wherein knocking is apt to occur, the same procedure is repeated as shown by an arrow J in FIG. 3. When the signal is of low level, the previous value $\Delta\theta$ for retarding the ignition timing is modified by subtracting a constant value $\theta_A$ so that the ignition timing is advanced. With this procedure of control, it is possible to operate the engine with an ignition timing which is advanced to a point where knocking is just to occur so that fuel economy and engine output can significantly be improved.

In the afore-described embodiment, the ignition timing controlled by detecting the knocking vibrations, however, it is possible to suppress knocking by adding water or other anti-knock agent to the fuel when knocking vibrations are detected. When the present invention is applied to a diesel cycle engine, the fuel injection timing may be controlled in accordance with the knocking vibration signals.

Figure 4:
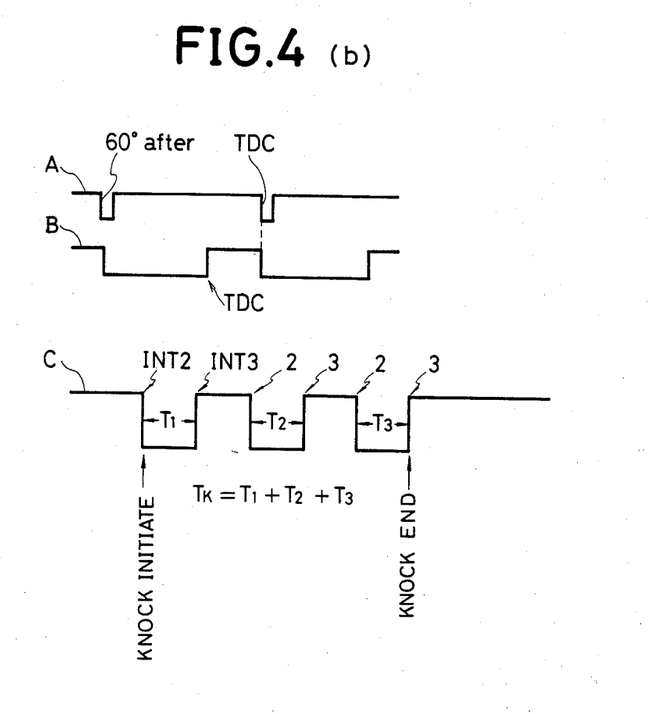
Figure 4A:
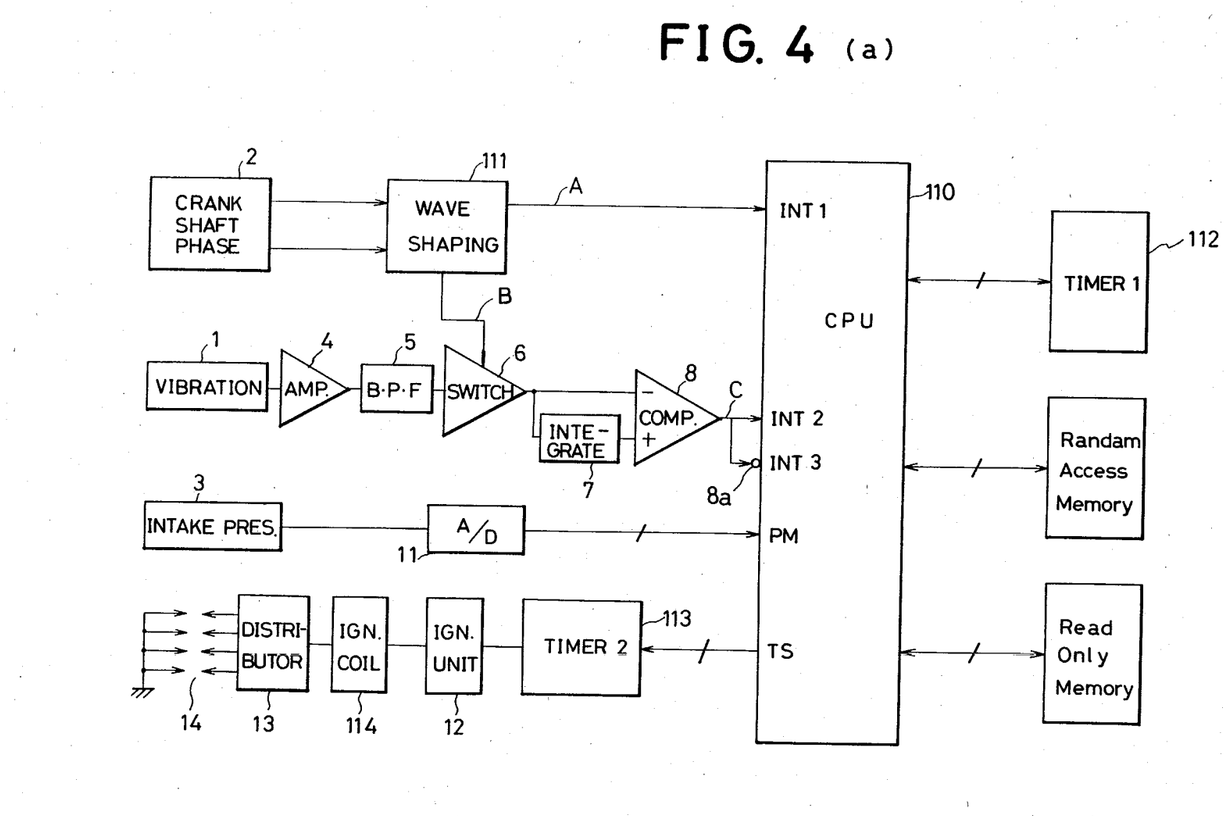
FIG. 4(a) is a diagram showing a feature embodiment of the present invention.

Referring now to FIG. 4(a), there is shown another embodiment of the present invention in which corresponding parts are designated by the same reference numerals as in the previous embodiment. In this embodiment, there is provided a controller 110 which may be comprised of a microprocessor having input terminals $INT_1$, $INT_2$ and $INT_3$. The signal from the crankshaft phase detector 2 is applied to a wave shaping circuit 111 which has two outputs A and B respectively connected with the input terminal $INT_1$ of the controller 110 and the electronic switching device 6. As shown in FIG. 4(b), negative pulses are produced at the output A of the circuit 111 at timings 60° after top dead center in respective operating cycles. At the output B, the signal turns to low level at 60° after top dead center and to high level at the top dead center. Thus, a high level signal is applied to the switching device 6 between the top dead center and 60° after top dead center.

Figure 6:
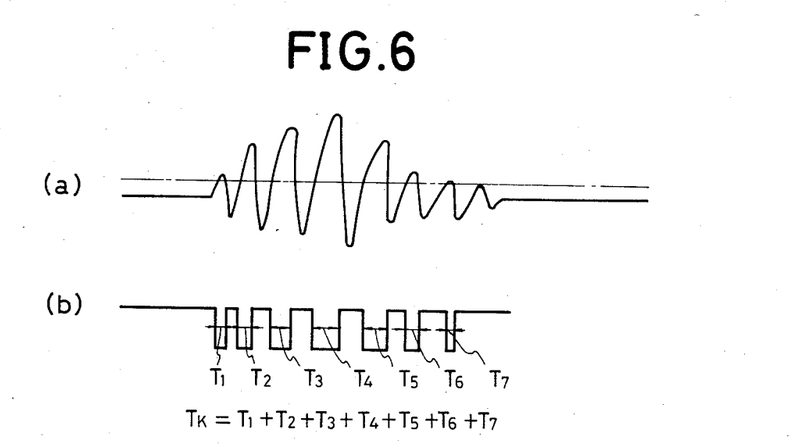
FIG. 6 shows the principle of measurement of durations of knocking vibrations in the embodiment shown in FIG. 4(a)

As in the previous embodiment, the comparator 8 functions to compare the vibration signals such as those shown by solid lines in FIG. 6(a) with a reference signal which is provided by the integrating circuit 7 as shown by broken lines, and produce negative output pulses as shown in FIG. 6(b) when the vibration signals are greater than the reference signal. The output of the comparator 8 is applied on one hand directly to the input terminal $INT_2$ of the controller and on the other hand through an inverter 8a to the input terminal $INT_3$.

Thus, the input signal to the terminal $INT_2$ is turned to low level at the beginning of each negative output pulse c from the comparator 8 whereas the input signal to the terminal $INT_3$ at the end of each negative outpulse c as shown in FIG. 4(b).

The controller 110 is associated with a first timer 112 which functions to count the duration time in which knocking is taking place. Further, there are provided a random access memory RAM storing control data and a read only memory ROM storing control programs and control maps. The controller 10 has an output TS connected through a second timer 113 which is in turn connected with the igniter unit 12. Between the igniter unit 12 and the distributor 13, there is provided an ignition coil 114. In the controller 110, interruption takes place when a negative pulse is received at each of the terminals $INT_1$, $INT_2$ and $INT_3$. The second timer 113 starts to produce an output after a predetermined time from an instance when a signal is received from the terminal TS.

Figure 5:
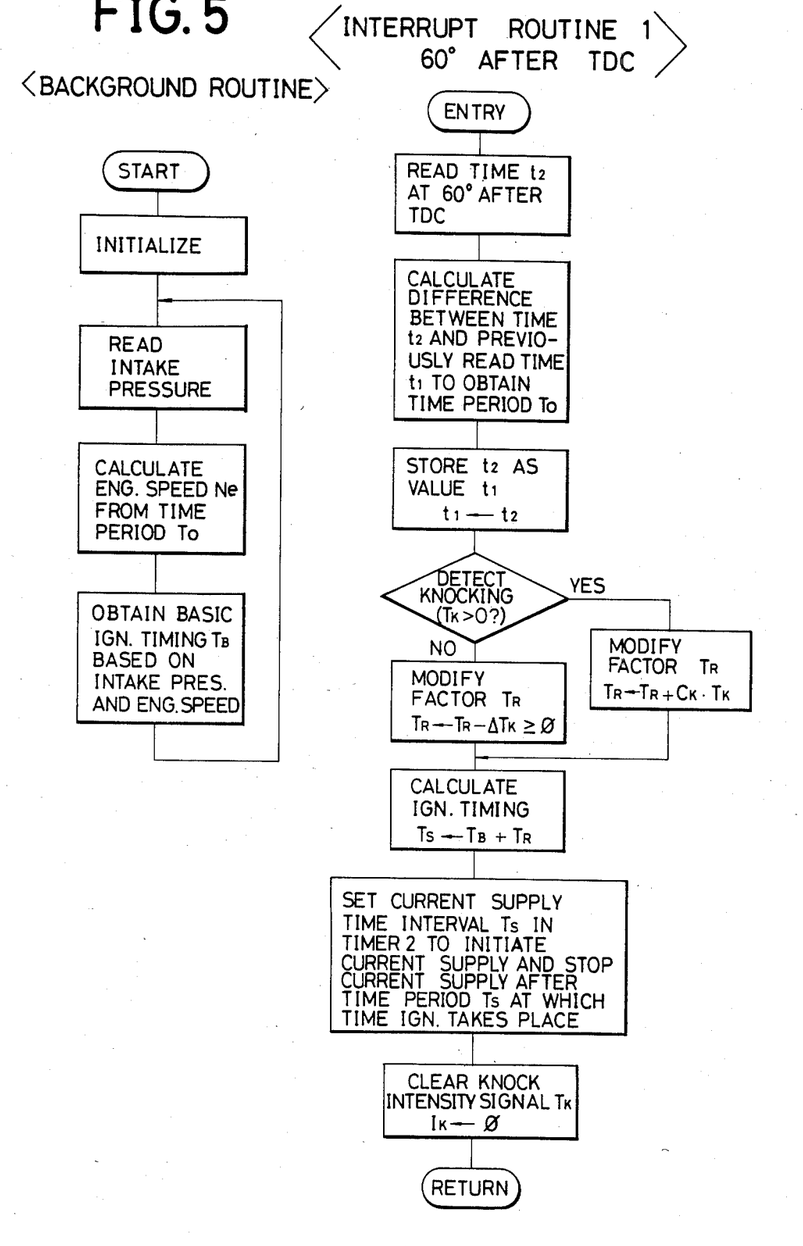
FIG. 5 is a chart showing the program flow adapted in the embodiment shown in FIG. 4(a)

Referring to FIG. 5, particularly to the background routine thereof, the signals from the A/D converter 11 is periodically sampled as the intake pressure signals. The signals A applied from circuit 111 to the terminal $INT_1$ is used to calculate the engine speed Ne. In calculating the engine speed Ne, use is made of the signal representing the period To between two succeeding signals A which is obtained in the manner described later. The intake pressure signal and the engine speed signal are then used to determine the basic ignition timing $T_B$. In this embodiment, the basic ignition timing $T_B$ is represented as the time interval from the negative input pulse A applied to the terminal $INT_1$.

In each cycle, an interrupt routine 1 takes place 60° after top dead center under the signal applied to the terminal $INT_1$. In this interrupt routine, the time $t_2$ at which the signal A is applied to the terminal $INT_1$ is obtained from the first timer 112 and the time $t_2$ is compared with the corresponding time $t_1$ taken in the previous interrupt routine 1 to calculate the time period To succeeding times. The time period To is used to calculate the engine speed Ne as previously described.

An interrupt routine 2 takes place when the engine vibration signal becomes greater than the reference value. In this interrupt routine, the time $t_3$ at which the negative pulse is applied to the terminal $INT_2$ is read from the first timer 112. An interrupt routine 3 takes place when a negative pulse is applied to the terminal $INT_3$ or when the vibration signal becomes lower than the reference value. The time $t_4$ at which the negative pulse is applied to the terminal $INT_3$ is read from the first timer 112. The duration time Tn of the knocking vibration is then calculated by the difference between the times $t_4$ and $t_3$. When the vibration signals are repeatedly produced as shown in FIG. 6(a), the duration times $T_1$, $T_2$, $T_3$, $T_4$ ... are summed up to obtain the total knocking duration time $T_k$ which represents the intensity of the knocking.

Turning back to the interrupt routine 1, judgement is made based on the value $T_k$ as to whether knocking is taking place or not. When the value $T_k$ is greater than zero, it is judged that knocking has occurred and the ignition timing modifying value $T_R$ is modified by adding $C_k \cdot T_k$, where $C_k$ is a constant. The value $T_R$ thus obtained is added to the basic ignition timing $T_B$ to determine the desired ignition timing $T_S$. The value $T_S$ is applied to the second timer 113 and, after the lapse of the time period $T_S$, a signal is applied from the timer 113 to the igniter unit 12. It will be understood that an increase in the value $T_R$ as described above will make the ignition timing retarded because the timing $T_S$ is a delay time from the instance 60° after top dead center wherein the negative pulse A is applied to the input terminal $INT_1$. When the value $T_k$ is not greater than zero, the value $T_R$ is modified by subtracting a constant value $\Delta T_k$. Thus, the ignition timing is advanced by a predetermined value. At the end of the interrupt routine 1, the value $T_k$ is cleared and, when further knocking vibrations are detected, the interrupt routines 2 and 3 are carried out.

The invention has thus been shown and described with reference to specific embodiments, however, it should be noted that the invention is in no way limited to the details of the illustrated arrangements but changes and modifications may be made without departing from the scope of the appended claims.

I claim:

1. Engine knocking detecting device to avoid the superpositioning of succeeding integrated signals during repetitive engine knocking comprising:

engine vibration sensing means for sensing engine vibrations and producing electric signals representing the engine vibrations;

knocking detecting circuit means including:

knocking signal discriminating means for detecting signals representing engine vibrations caused by engine knocking; and, knocking intensity detecting means for detecting durations of the signals representing the engine knocking vibrations to thereby detect intensity of the engine knocking;

said knocking intensity detecting means including:

means for determining a sampling period in each cycle of engine operation;

means for sensing the signals detected by said discriminating means in said sampling period and determining the duration as a time between start and end of the signals detected by the discriminating means in said sampling period; and, means for producing a knocking intensity signal which increases in response to an increase in the duration of the signals representing the engine knocking.

2. Engine knocking detecting means in accordance with claim 1 in which said knocking intensity detecting means includes means for measuring duration times of the respective signals representing the engine knocking vibrations and summing the duration times.

3. Engine knocking detecting means in accordance with claim 1 is which said knocking signal discriminating means includes filter means which allows to pass only the signals of frequency band corresponding to engine knocking vibrations and comparing means for comparing the signal which has passed through the filter means with a reference value and producing an output when the signal from the filter means is different from the reference value.

4. Engine knocking detecting means in accordance with claim 1 in which said knocking signal discriminating means includes means for comparing the electric signals with a reference signal and producing signal pulses when the electric signals deviate in one direction from the reference signal, said knocking intensity detecting means including means for measuring the width of the signal pulses to determine the intensity of the engine knocking.

5. Engine knocking detecting means in accordance with claim 1 in which said knocking signal discriminating means includes means for comparing the electric signals with a reference signal and producing signal pulses when the electric signals exceed the reference signal, said knocking intensity detecting means including means for measuring the width of the signal pulses to determine the intensity of the engine knocking.

6. Engine knocking detecting means in accordance with claim 3 which further includes integrating means for integrating the signal which has passed through the filter means to provide said reference value which varies in accordance with noise.

7. Ignition control means for internal combustion engines including ignition timing control means, a knocking detecting device to avoid the superpositioning of succeeding integrated signals during repetitive engine knocking comprising:

engine vibration sensing means for sensing engine vibrations and producing electric signals representing the engine vibrations;

knocking detecting circuit means including knocking signal discriminating means for detecting signals representing engine vibrations caused by engine knocking;

knocking intensity detecting means for detecting durations of the signals representing the engine knocking vibrations to thereby detect intensity of the engine knocking, said knocking intensity detecting means including:

means for determining a sampling period in each cycle of engine operation;

means for sensing the signals detected by said discriminating means in said sampling period and determining the duration as a time between start and end of the signals detected by the discriminating means in said sampling period; and, means for producing a knocking intensity signal which increases in response to an increase in the duration of the signals representing the engine knocking;

said ignition timing control means including means for advancing ignition timing by a predetermined value in each operating cycle of the engine when knocking is not detected and retarding the ignition timing by a value corresponding to the duration of the signals representing the engine knocking vibrations.

* * * * *